(12) United States Patent
Yamaki et al.

(10) Patent No.: US 7,404,474 B2
(45) Date of Patent: Jul. 29, 2008

(54) SHOCK ABSORBING COMPONENT

(75) Inventors: Jogen Yamaki, Saitama (JP); Daisei Abe, Saitama (JP); Yuta Urushiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 250 days.

(21) Appl. No.: 11/180,922

(22) Filed: Jul. 14, 2005

(65) Prior Publication Data

US 2006/0011435 A1 Jan. 19, 2006

(30) Foreign Application Priority Data

Jul. 15, 2004 (JP) .............................. 2004-209217

(51) Int. Cl.
 *F16F 7/12* (2006.01)
(52) U.S. Cl. ...................... 188/376; 188/371
(58) Field of Classification Search ................. 188/371, 188/372, 376, 377; 296/187.03, 187.09, 296/187.1, 187.11, 187.12; 428/364, 365, 428/373, 374
See application file for complete search history.

(56) References Cited

U.S. PATENT DOCUMENTS

| | | | | |
|---|---|---|---|---|
| 3,983,962 A | * | 10/1976 | Torke | .......................... 188/377 |
| 5,419,416 A | * | 5/1995 | Miyashita et al. | ........... 188/371 |
| 5,972,134 A | * | 10/1999 | Buschsieweke et al. | ..... 148/567 |
| 6,840,542 B2 | * | 1/2005 | Kim | ............................ 188/377 |
| 6,994,350 B2 | * | 2/2006 | Krajewski et al. | ....... 296/187.03 |

FOREIGN PATENT DOCUMENTS

| | | |
|---|---|---|
| JP | 64-067483 | 3/1989 |
| JP | 04-005178 | 1/1992 |
| JP | 6-101732 | 4/1994 |
| JP | 06-135291 | 5/1994 |
| JP | 08-093820 | 4/1996 |

* cited by examiner

*Primary Examiner*—Thomas J Williams
(74) *Attorney, Agent, or Firm*—Arent Fox LLP

(57) ABSTRACT

A shock absorbing component used as a structural component which realizes a larger energy absorption volume compared to the conventional shock absorbing component is provided. According to the present invention, with regards to the shock absorbing component, a sheet-shaped longitudinal component is formed by placing two or more types of sheet-shaped part materials alternately in the longitudinal direction, and this sheet-shaped longitudinal component is implemented in all of the layers or a part of the layers in the surface component of the shock absorbing component. Therefore, when load due to impact if applied to this shock absorbing component, unlike cases wherein the surface component is formed from a single component, the direction of the load and strain is intricately dispersed by two or more types of sheet-shaped longitudinal components and the concentration of load and deformation is prevented, thereby replacing impact energy with energy which destroys a wide area of the shock absorbing component.

13 Claims, 11 Drawing Sheets

- expanded surface
- side surface
- 101
- compressed surface
- load during impact

- 102
- load during impact comparing specific energy absorption volume

SHOCK ABSORBING COMPONENT

CROSS-REFERENCE TO RELATED APPLICATION

This application is based upon and claims the benefits of priority from Japanese Patent Application No. 2004-209217 filed on Jul. 15, 2004, the entire contents of which are incorporated herein by reference.

FIELD OF THE INVENTION

The present invention relates to, for example, a shock absorbing component. More particularly, the present invention relates to a shock absorbing component used as a structural component in automobiles which has high energy absorption volume.

RELATED ART

Conventionally, in addition to aluminum, fiber reinforced materials have been used as light-weight structural material. Out of these composite materials, those which reinforce material with fibers are called fiber-reinforced materials, of which fiber-reinforced rubber (FRR), fiber-reinforced metal (FRM), fiber-reinforced ceramic (FRC), fiber-reinforced plastic (FRP) are known. In particular, FRP is a material which uses plastic as a matrix (substrate), and it is known that glass or carbon fibers and the like are generally used as reinforcing material.

Fiber-reinforced plastic which uses carbon fibers as reinforcing material are called carbon fiber-reinforced plastic (CFRP) and is positioned in the core of advanced composite materials. It is known as structural material which is essential in the aviation field and space field as light-weight, high-strength, and high-modulus material. Unidirectional material (UD material) and cross material which have differing structure and characteristics according to the alignment of the carbon fibers are known as CFRP materials. UD material has a material configuration wherein carbon fibers are laid out thinly in one direction and molded by epoxide resin or the like. On the other hand, cross material has a material configuration wherein carbon fibers are woven into a fabric-state and molded by epoxide resin or the like. These CFPR have heat-resisting and corrosion-resisting properties while being light in weight, about 25% the weight of iron.

On the other hand, as one example of structural components, in vehicles such as automobiles, more superior shock energy absorbency is expected for beam material used in the side parts of automobiles, such as the front pillar, center pillar, and rear pillar, as protective measures for passengers. Additionally, with regards to materials for these pillars; light-weight materials are preferred for further mileage improvement, and aluminum material or aluminum base alloy materials are known. Shock absorbing material which is more light-weight and has higher energy absorption volume than these materials is desired.

For example, the frame which is placed as side part structural material in automobiles is formed by extrusion-molding or press-molding a single material and shaping the cross-sections as closed cross-sections and large-cross sections, and thereby improving strength and rigidity and enhancing energy absorption volume at the time of impact. In general, as deformation mode at the time of side surface impact, giving the center pillar as an example, it is subject to three-point bending which bends with the upper side roof rail and the lower side sill as the fulcrums. Therefore, a side part structural material which has high resistance to the load of three-point bending and has little flexure due to bending is desired.

Furthermore, if aluminum material or aluminum base alloy material (hereinafter referred to as simply aluminum) is used as the shock absorbing component for pillars, a hollow structure is adopted to attain a large polar moment of inertia of area with the same weight. With regards to deformation when using beam material such as aluminum, characteristically, load strength deteriorates rapidly immediately after the load applied reaches maximum strength. This indicates that, when the load applied exceeds the yielding point, the amount of deformation of the automobile body once yielding point is exceeded is large because the shock absorbing component can be deformed easily with a small load. In other words, as a result, the energy absorption volume calculated by the product of load and displacement decreases because the bearable load decreases as soon as the yielding point is exceeded and a large automobile body is deformed by a small load. Correspondingly, a characteristic desired in shock absorbing component for pillars is to continuously maintain load strength until a certain displacement is reached, even if load in the vicinity of the yielding point is continuously applied after the load has reached maximum strength and has exceeded the yielding point.

With regards to the foregoing, a component wherein FPR material is adjoined to the expanded surface side of hollow aluminum material and integrated is proposed in Patent Reference 1. This is a technology which attempts to realize large energy absorption and small deformation by absorbing shock with the compressed surface and reducing the amount of deformation to the surface on the expanded surface, by using a plastic component which is easily deformed on the compressed surface and a high-strength, light-weight component on the expanded surface.

[Patent Reference 1] Japanese Patent Laid-Open Publication 06-101732

SUMMARY OF THE INVENTION

However, in the shock absorbing component in Patent Reference 1, because load and deformation is concentrated on one point of the shock absorbing component to which the load is applied, the absorption energy volume of the shock absorbing component is influenced largely by the strength of the surface component of the compressed surface and its energy absorption volume becomes saturated. Furthermore, in the shock absorbing component of Patent Reference 1, although aluminum and FRP are joined by bolts, in a structure such as this, stress concentration may be generated on the bolt joined part with the deformation sue to load and the joined part may break before the advantages unique to this invention are realized. Even if adhesive is used in place of bolts, the upper limit of the strength of-the entire beam material will be determined by the strength of the adhesive.

Therefore, preventing stress concentration which accompanies deformation, by preventing the concentrating of load and deformation to one point of a shock absorbing component when impact load is applied, and enhancing the absorption energy rate of the entire shock absorbing component are desired.

The object of the present invention is to provide a shock absorbing component which has an enhanced energy absorption rate compared to that of a conventional shock absorbing component.

The inventors of the present invention have, as a result of keen research into the resolution of the foregoing issues, found that shock absorbing component wherein sheet-shaped part materials of two or more types characterized by tensile load characteristics, tensile displacement characteristics, compression load characteristics, compression displacement characteristics or a combination thereof, are placed alternately to the longitudinal direction to form a sheet-shaped longitudinal component which is used for all layers or a part of the layers in the surface material of the shock absorbing component can enhance the energy absorption performance against impact, and thus, competed the present invention. More particularly, the present invention provides a shock absorbing component such as that below.

(1) A shock absorbing component which has a longitudinal direction and a lateral direction, absorbs impact by performing bending deformation roughly perpendicular to the longitudinal direction, and is a hollow material boxing and forming flat surfaces or curved surfaces by side components formed by layering sheet-shaped components, wherein a sheet-shaped longitudinal component is formed by placing two or more types of sheet-shaped part materials characterized by one or more characterizations from a group comprising tensile maximum load characteristics, tensile maximum displacement characteristics, compression maximum load characteristics, and compression maximum displacement characteristics, alternately in the longitudinal direction and this sheet-shaped longitudinal component is implemented in all of the layers or a part of the layers in the surface component.

(2) The shock absorbing component according to (1) wherein the sheet-shaped part material is formed from fiber reinforced material.

(3) The shock absorbing component according to (2) wherein the fiber reinforcement material is a sheet-shaped UD material with fiber direction aligned in roughly one direction.

(4) The shock absorbing component according to (3) wherein the sheet-shaped UD materials having its fiber direction of the sheet-shaped UD material is 0 degrees in the longitudinal direction, layered with the fiber direction of another sheet-shaped UD material layered therewith is 90 degrees in the longitudinal direction; and the fiber direction of the sheet-shaped part material formed from and the sheet-shaped UD material is 45 degrees in the longitudinal direction, layered with the fiber direction of the another sheet-shaped UD material layered therewith is −45 degrees in the longitudinal direction; is disposed by placing alternately in longitudinal direction of the sheet-shaped longitudinal component, which is imlemented in all of the layers or a part of the layers in the surface component.

(5) The shock absorbing component according to (3) or (4) wherein the fiber reinforced material is fiber reinforced material.

(6) The shock absorbing component according to any one of (1) to (5) wherein the thickness of the side component of the shock absorbing component differs with the type of sheet-shaped part materials.

(7) An automobile implementing the shock absorbing component according to any one of (1) to (6) as structural component.

(8) A method for enhancing energy absorption by using a shock absorbing component which has a longitudinal direction and a lateral direction and is a hollow material boxing and forming flat surfaces or curved surfaces by side components formed by layering sheet-shaped components, wherein a sheet-shaped longitudinal component is formed by placing two or more types of sheet-shaped part materials characterized by one or more characterizations from a group comprising tensile maximum load characteristics, tensile maximum displacement characteristics, compression maximum load characteristics, and compression maximum displacement characteristics, alternately in the longitudinal direction and this sheet-shaped longitudinal component is implemented in all of the layers or a part of the layers in the surface component.

In the present invention, with regards to the shock absorbing component, a sheet-shaped longitudinal component is formed by placing two or more types of sheet-shaped part materials characterized by one or more characterizations from a group comprising tensile maximum load characteristics, tensile maximum displacement characteristics, compression maximum load characteristics, and compression maximum displacement characteristics, alternately in the longitudinal direction, and this sheet-shaped longitudinal component is implemented in all of the layers or a part of the layers in the surface component. Therefore, when load due to impact if applied to this shock absorbing component, unlike cases wherein the surface component is formed from a single component, the direction of the load and strain is intricately dispersed by two or more types of sheet-shaped longitudinal components and the concentration of load and deformation is prevented, thereby replacing impact energy with energy which destroys a wide area of the shock absorbing component. As a result, a shock absorbing component with enhanced specific energy absorption volume compared to conventional shock absorbing components can be provided.

According to the present invention, when load due to impact is applied to the shock absorbing component, the direction of the load and strain is intricately dispersed by two or more types of sheet-shaped longitudinal components and the concentration of load and deformation is prevented, thereby replacing impact energy with energy which destroys a wide area of the shock absorbing component. As a result, a shock absorbing component with increased impact energy absorption rate compared to conventional shock absorbing components can be provided.

DESCRIPTION OF THE PREFERRED EMBODIMENT

An example of the preferred embodiment of the present invention is explained with reference to the drawings.

Figure 1A:
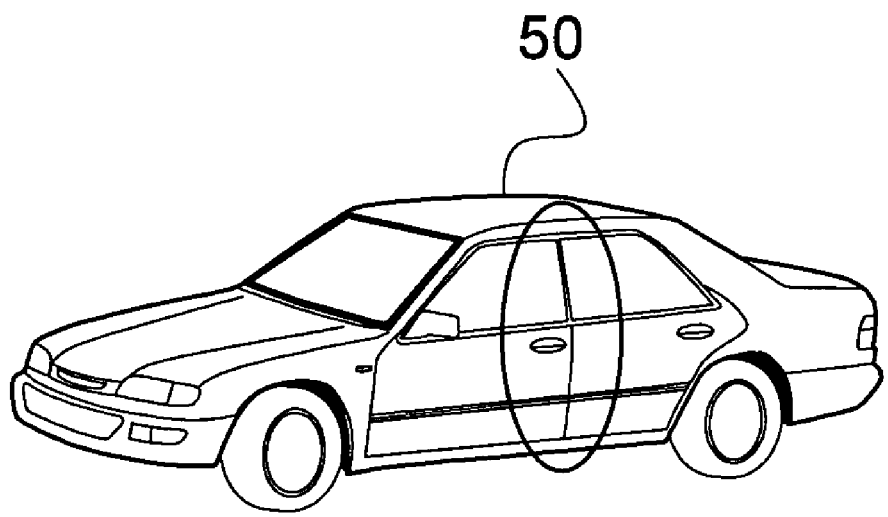
FIG. 1A is a pattern diagram showing an example wherein the shock absorbing component according to the embodiment of the present invention is applied to the structural component of automobile.
Figure 1B:
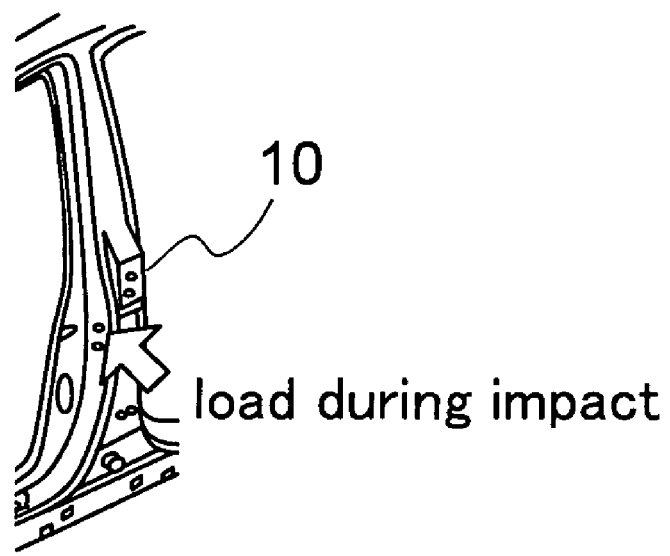
FIG. 1B is a pattern diagram showing an example wherein the shock absorbing component according to the embodiment of the present invention is applied to the structural component of automobile.

FIGS. 1A, B, C, and D show an example wherein the shock absorbing component 101 according to the preferred embodiment of the present invention is applied to the center pillar 10 of automobile 50. As shown in FIGS. 1B, C, and D, the object of the present invention is to provide, for example, shock absorbing components 101 and 102 which realize sufficient energy absorption for impact due to side impact to the side surface of an automobile. As other examples of application, this present invention can be used, for example, in the front pillars and rear pillars of automobiles, as structural component of vehicles such as motorcycles, bicycles, airplanes, trains and the like, or as structural components for architecture and the like.

The shock absorbing components 101 and 102 have a longitudinal direction and a lateral direction and absorb impact by performing bending deformation roughly perpendicular to the longitudinal direction. The shock absorbing components 101 and 102 comprises surface components, and this surface component has a hollow form which boxes and forms flat surfaces or curved surfaces. The surface component is formed from layering sheet-shaped component which is a component in the shape of a thin sheet. The sheet-shaped component is formed from fiber-reinforced rubber (FRR), fiber-reinforced metal (FRM), fiber-reinforced ceramic (FRC), fiber-reinforced plastic (FRP), iron, aluminum, resin and the like. Two or more types of materials with differing properties within these sheet-shaped components are placed alternately to the longitudinal direction of the shock absorbing component and forms sheet-shaped longitudinal components. The surface component of the shock absorbing component can be formed by layering only this sheet-shaped longitudinal component, or the surface component can be formed by layering this sheet-shaped longitudinal component and the sheet-shaped component.

In other words, sheet-shaped longitudinal component is formed by placing sheet-shaped parts material alternately, and the surface component of the shock absorbing component is formed by layering the sheet-shaped longitudinal component which sheet-shaped longitudinal component to with the foregoing other sheet components. In addition, as in FIG. 8B, with regards to the hollow, long material which is the base material, the surface component of the hollow, long material can be the sheet-shaped longitudinal component formed by placing two different types of sheet-shaped part material (sheet-shaped part material 20 and sheet-shaped part material 21) alternately.

Figure 1C:
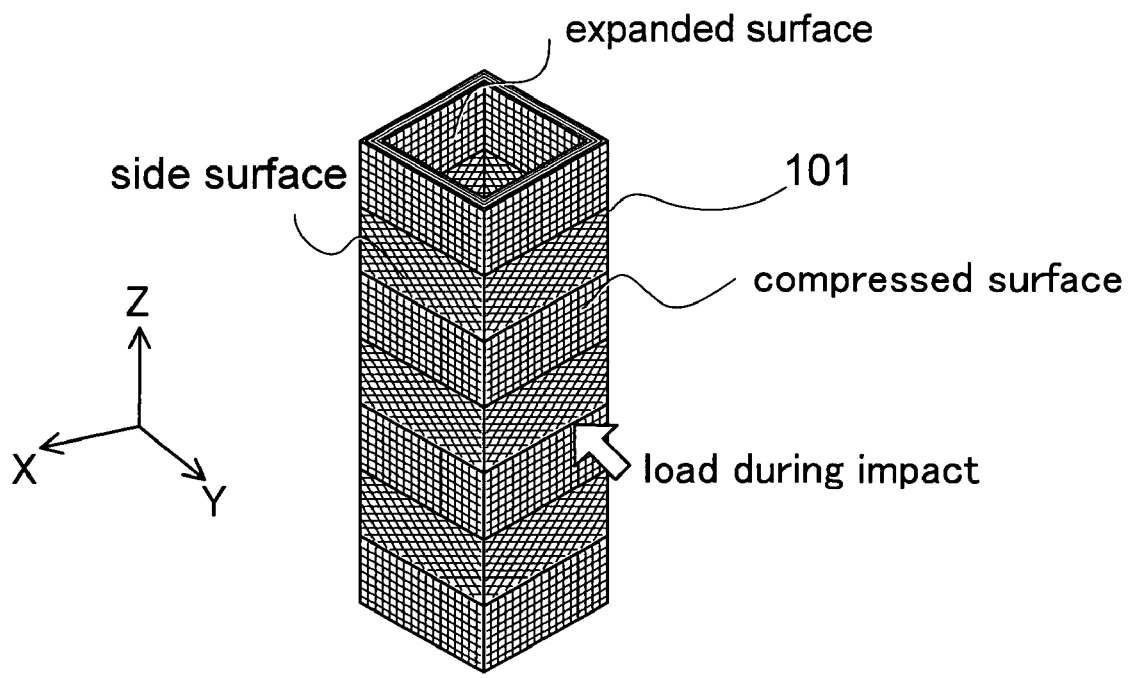
FIG. 1C is a pattern diagram showing an example wherein the shock absorbing component according to the embodiment of the present invention is applied to the structural component of automobile.
Figure 1D:
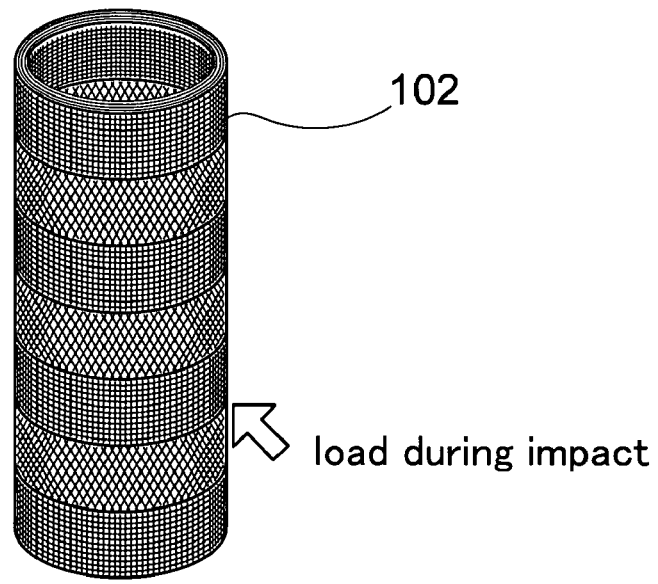
FIG. 1D is a pattern diagram showing an example wherein the shock absorbing component according to the embodiment of the present invention is applied to the structural component of automobile.

Compressed surface shown in FIG. 1C is a surface which directly receives load due to impact and is the surface almost parallel to the side surface of an automobile. In addition, it can also be a surface which mainly receives compressive stress. Expanded surface is a surface facing the compressed surface and is the surface which indirectly receives load due to impact. In addition, it can also be a surface which mainly receives tensile tress from the load due to impact. Furthermore, the side surface of the shock absorbing component is a surface roughly perpendicular to the compressed surface and is a surface indirectly receiving load due to impact. In addition, the side surface is a surface which mainly receives shear stress or compressive force or both due to load during impact and can also be a surface perpendicular to the side surface of an automobile.

If, for example, fiber reinforced materials are used in the shock absorbing components 101 and 102, carbon fiber, glass fiber, aramid fiber, and basalt fiber as reinforced fiber, and epoxide resin, polypropylene, unsaturated polyester, vinylester, and aluminum can be used as base materials for these fibers. With regards to the merging of these base materials and reinforced fibers, is can be layered sheet-shaped UD material wherein the fiber direction is aligned in one direction, or it can be cross material wherein the fibers are woven.

UD material is the material form of fiber reinforced material. A sheet-shaped UD material is a sheet-shaped fiber reinforced material wherein the reinforced fibers are aligned in basically one direction and hardened. One direction UD material is formed by aligning this sheet UD material in the same fiber direction and layering. Because the tensile strength in the fiber direction is high, one direction UD material is a fiber reinforced material which has anisotropy. In shock absorbing component 101, as one example, one direction UD material is used for the expanded surface and the compressed surface. In addition, unlike one direction UD material, the fiber direction can differ with each layer. For example, each surface component of shock absorbing component 101 and 102 is constructed by layering the next sheet-shaped UD material to be layered such that the fiber direction is to a fixed angle to the fiber direction of one sheet-shaped UD material.

Cross material is a material form of fiber reinforced material. It is sheet-shaped fiber reinforced material aligned in a fabric-state by weaving in fiber as the structure of reinforced fiber of fiber reinforced material or is fiber reinforced material wherein this sheet-shaped fiber reinforced material is layered. In other words, cross material is a fiber reinforced material wherein a flat surface is formed by weaving one strand or plural strands of reinforced fiber and this flat surface is hardened using resin substrate or the like. As weaving methods for forming a fabric-state, it can be flat-weaving or twill-weaving. Unlike one-direction UD material, cross material is generally a fiber reinforced material which is isotropic in strength.

Fiber reinforced plastic and fiber reinforced metal can be used as sheet-shaped part material which forms the sheet-shaped longitudinal component, and the material form can be that which implements UD material and cross material, or fiber reinforced plastic and fiber reinforced metal which have other material forms can also be used, and it can be iron, aluminum resin and the like.

When fiber reinforced material is used in surface component, the load characteristics of this material differs with the fiber direction of the fiber reinforcement material. Fiber direction is the direction of the fiber determined by aligning fiber in one direction when forming the fiber reinforcement material by combining fibers. In addition, an angle from one fiber direction is determined for the surface of the shock absorbing component, and this is referred to as fiber orientation angle (orientation angle). Fiber orientation angle is an angle determined by the center axis which extends in the longitudinal direction of the shock absorbing component, passing through the center of the shock absorbing component, and the fiber direction. For example, sheet-shaped UD material with an orientation angle of 30 degrees in the longitudinal direction is sheet-shaped UD material (30 degrees).

In shock absorbing component 101 and 102, as one example, the sheet-shaped longitudinal component is formed by alternately placing sheet-shaped part material comprising sheet-shaped UD material (0 degrees) and sheet-shaped UD material (90 degrees) layered by one layer and sheet-shaped part material comprising sheet-shaped UD material (45 degrees) and sheet-shaped material (−45 degrees) layered by one layer. Although a quadrangular prism-shaped or cylindrical shock absorbing component is shown in the diagram, as one example, as described hereafter, the shock absorbing component should be a suitable shape for a structural component (refer to FIGS. 11A~D).

In addition, all of the layers comprising the surface component of the shock absorbing component does not have to be a sheet-shaped longitudinal component, and the sheet-shaped longitudinal component can be implemented in only a part if the layers. For example, the shock absorbing component can be formed by implementing a component using UD material or cross material as the surface component can be the frame of the shock absorbing component and by placing two or more types of partial shock absorbing components to cross in the longitudinal direction on this frame.

Figure 11A:
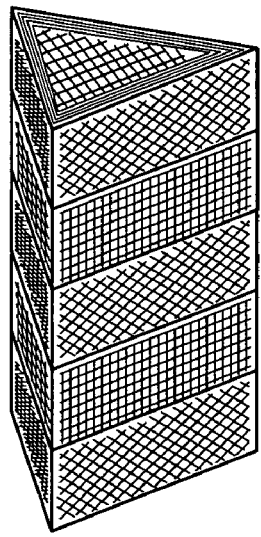
FIG. 11A is a diagram showing embodiment of shock absorbing component other than the embodiment of the present invention.
Figure 11B:
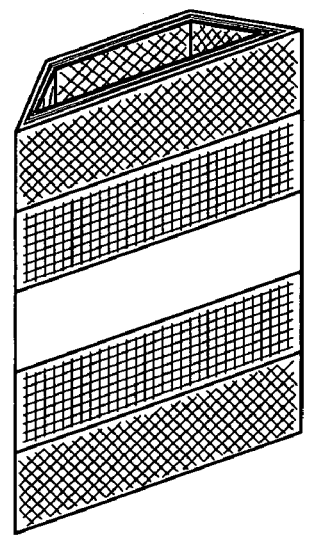
FIG. 11B is a diagram showing embodiment of shock absorbing component other than the embodiment of the present invention.
Figure 11C:
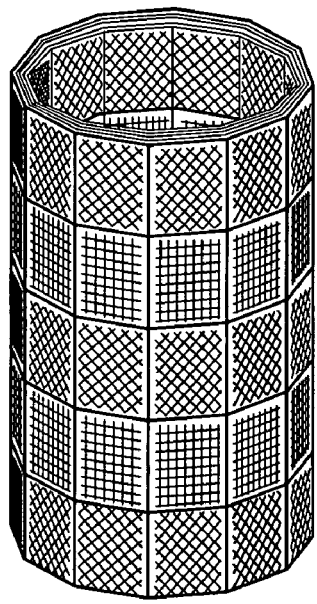
FIG. 11C is a diagram showing embodiment of shock absorbing component other than the embodiment of the present invention.

Furthermore, although two types of sheet-shaped part materials are used in the shock absorbing component 101 and 102, two or more types of sheet-shaped part materials can be implemented as sheet-shaped longitudinal components (refer to FIG. 11B).

It is explained here that a shock absorbing component of fiber reinforced materials has a higher-load characteristic than the conventional aluminum. Component which realizes shock absorption by deforming by bending perpendicular to the longitudinal direction of the shock absorbing component is considered from the perspective of bending moment.

Figure 2:
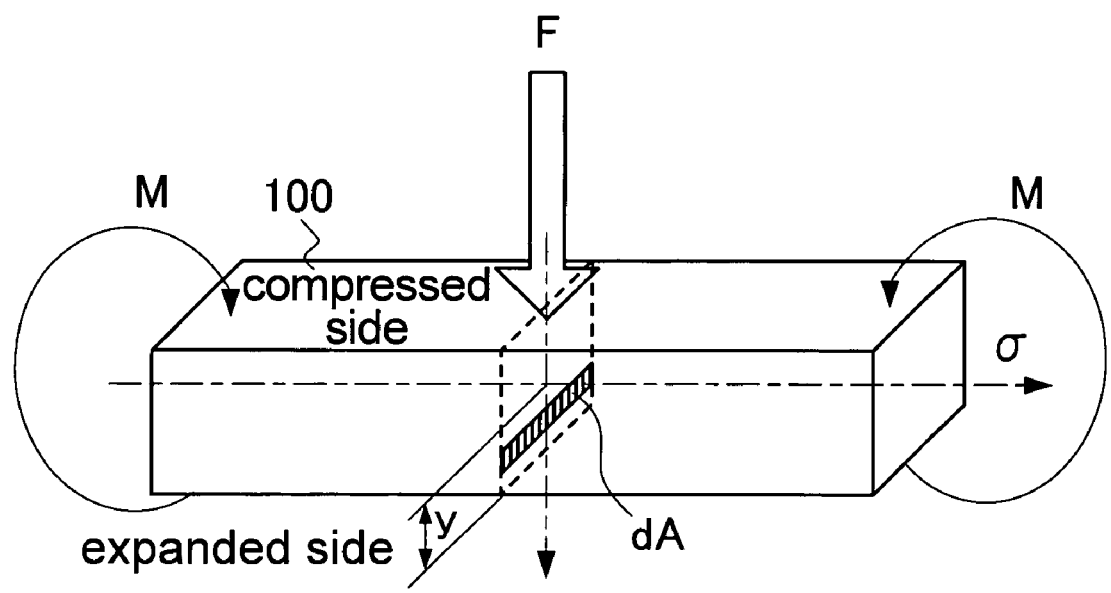
FIG. 2 is a schematic diagram showing a bending moment, when vertical stress is generated in the shock absorbing component

Generally, with regards to bending in beams, when vertical stress is generated in the shock absorbing component 100, as shown in FIG. 2, and if distance from the center axis of the shock absorbing component 100 is distance. y, micro-area dA, and the strength of the shock absorbing component σ, yσdA moment is generated. Therefore, the bending moment which affects the beam center part cross-section is as expressed in Equation (1)

$$M = \int_A y\,\sigma\,dA \quad \text{[Equation 1]}$$

Here, strength σ can be adjusted by the structure and the orientation angle of fiber reinforced material and can be set to be stronger than aluminum. For example, the strength of one direction UD material (orientation angle of 0 degrees) (Toray Industries, Inc. manufactured Carbon fiber T700S, implementing epoxide resin as substrate) is 2600MPa and the strength of cross material is 798 MPs. Correspondingly, the strength of aluminum (5000 system) is small, 270 MPa (Young's modulus 71 GPa, destruction strain 14%, and Poisson's ratio 0.3). Therefore, in aluminum and fiber reinforced material (FRP material) wherein the distance y from the central axis is equal, because the strength of fiber reinforced material (FRP material) is larger, the bending moment which can be tolerated increases, and enables the fiber reinforced material to have a larger load characteristic.

Furthermore, it is explained here that fiber reinforced material has high energy absorption performance because the cross-section of the shock absorbing component does not change even when a load is added. If the shock absorbing component is presumed to have a perfect-plasticity body, the plasticity bending moment of the beam is as expressed in Equation (2) (refer to FIGS. 3A~C).

$$M_p = \sigma_y A (y_1 + y_2)/2 \quad \text{[Equation 2]}$$

Here, $\sigma_y$ is the yield point stress, $y_1$ is the distance from the neutral axis to the compressed surface, $y_2$ is the distance from the neutral axis to the expanded surface, and A is the center part cross-section area of the shock absorbing component. Each corresponding variable is stated in FIG. 3A.

Figure 3:
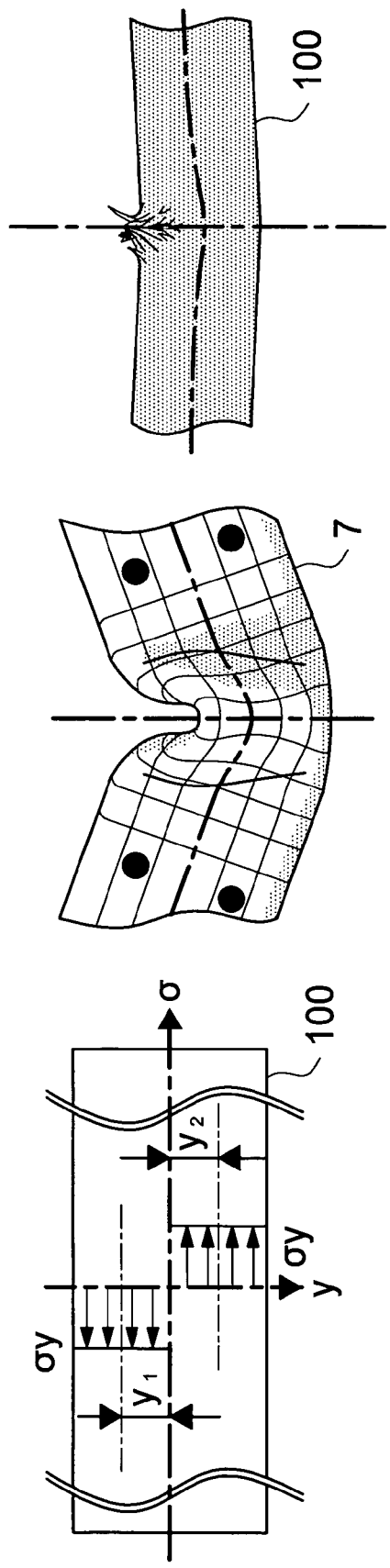
FIG. 3A is a pattern diagram showing the plasticity bending moment to compare the aluminum with the CFRP material.
FIG. 3B is a pattern diagram showing the plasticity bending moment to compare the aluminum with the CFRP material.
FIG. 3C is a pattern diagram showing the plasticity bending moment to compare the aluminum with the CFRP material.

FIG. 3B is a pattern diagram showing the shape of aluminum which has been deformed by applying load to the proximity of the yielding point, when aluminum is used as the shock absorbing component. As shown in the diagram, in the case of aluminum, the value of the center part cross-section area A of aluminum 7 becomes smaller with the deformation due to load. With this, distance $y_1$ and $Y_2$ from the neutral axis to the compressed surface and the extended surface also decrease. As a result, the plasticity bending moment $M_p$ also decreases and therefore, the load value must also be decreased after applying load up to the vicinity of the yielding point.

FIG. 3C is a pattern diagram showing the shape of the fiber reinforcement material (FRP material) which had been deformed by applying load up to the vicinity of the yielding point, when using fiber reinforcement material as the shock absorbing component 100. In the case of fiber reinforcement material, the foregoing cross-section area A and the distances $y_1$ and $y_2$ are stable, as shown in the diagram, where load is applied. This is because denting from load, such as with aluminum, does not occur because the plasticity deformation of fiber reinforcement material progresses. Therefore, from Equation (2), the value of plasticity bending moment $M_p$ does not decrease and the load value does not immediately decrease even when load is applied up to the proximity of the yielding point. As a result, it can be expected that fiber reinforcement material indicates high energy absorption performance.

Figure 4:
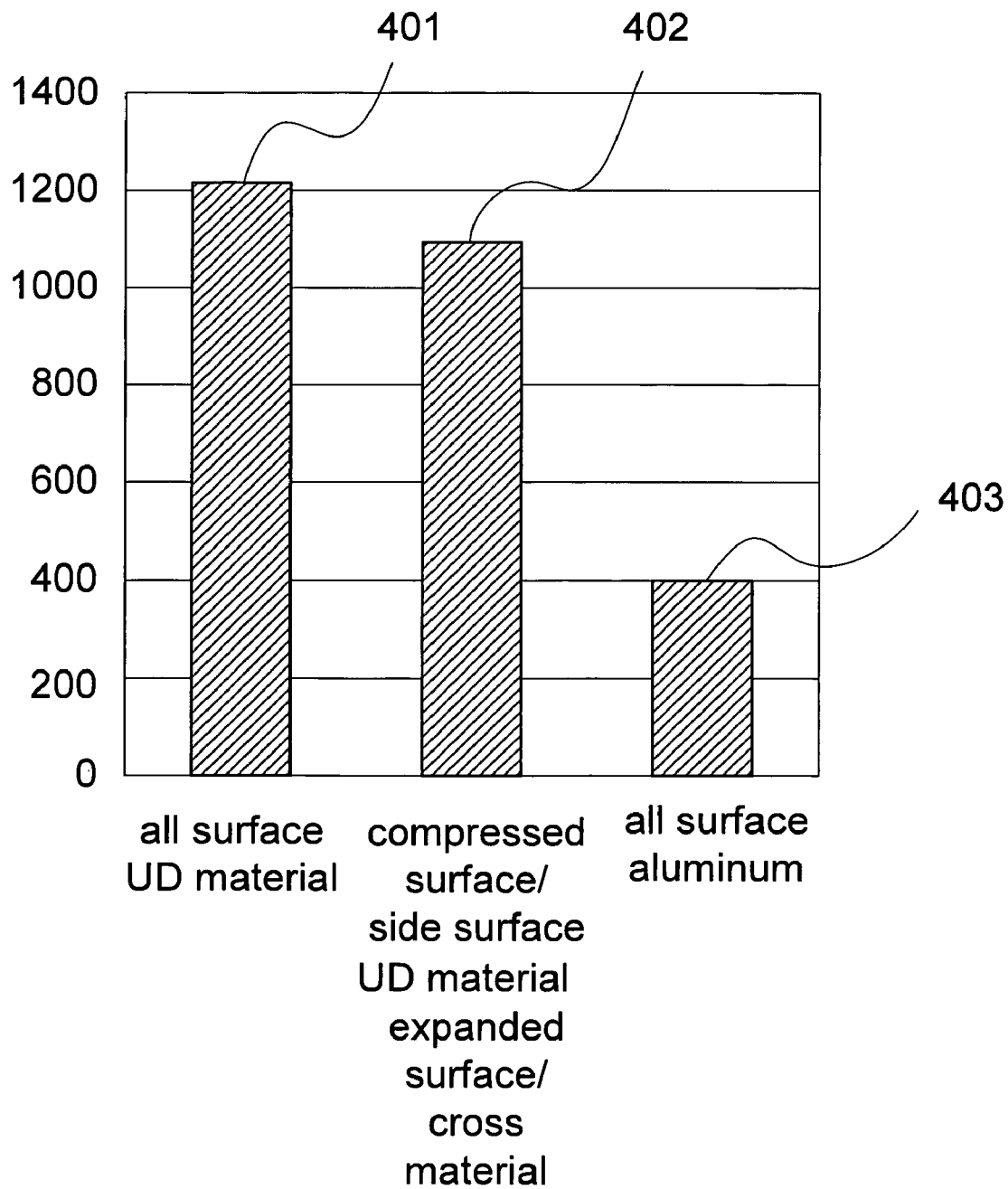
FIG. 4 is a graph chart comparing specific energy absorption volume of three defferent shock absorbing component.

FIG. 4 is a graph chart comparing specific energy absorption volume (energy absorption volume per unit weight). Fiber reinforcement material, here, uses Toray Industries, Inc. manufactured Carbon fiber T700S as reinforced fiber and implements epoxide resin for substrate. The Young's modulus of one-direction UD material (orientation angle of 0 degrees) is 140 GPa, the destruction strain 1.9%, Poisson's ratio 0.32, and the strength 2600 MPa. The Young's modulus of cross material is 89 GPa, the destruction strain 0.9%, Poisson's ratio 0.07, and the strength 798 MPa.

In an experiment, the specific gravity of aluminum shock absorbing material is 7.6/cm$^3$ and the specific gravity of CFRP material is 1.6/cm$^3$. Graph 402 shows the results of when cross material is implemented in only the extended surface and the one-direction UD material (0 degrees) for all other surfaces; Graph 401 shows the results of when one-direction UD material (0 degrees) is implemented for all surfaces. Graph 403 is the results when the aforementioned aluminum is implemented in the shock absorbing component. The specific energy absorption volume of shock absorbing component 101 formed from one-direction UD material (0 degrees) was over 1200 J/kg, to the specific energy absorption volume of shock absorbing component, formed from aluminum, of about 400 J/kg. It can be considered that CFRP material realizes higher energy absorption because it has larger bending moment than aluminum and there is no decrease in the cross-section area of the compressed part due to load.

Figure 5A:
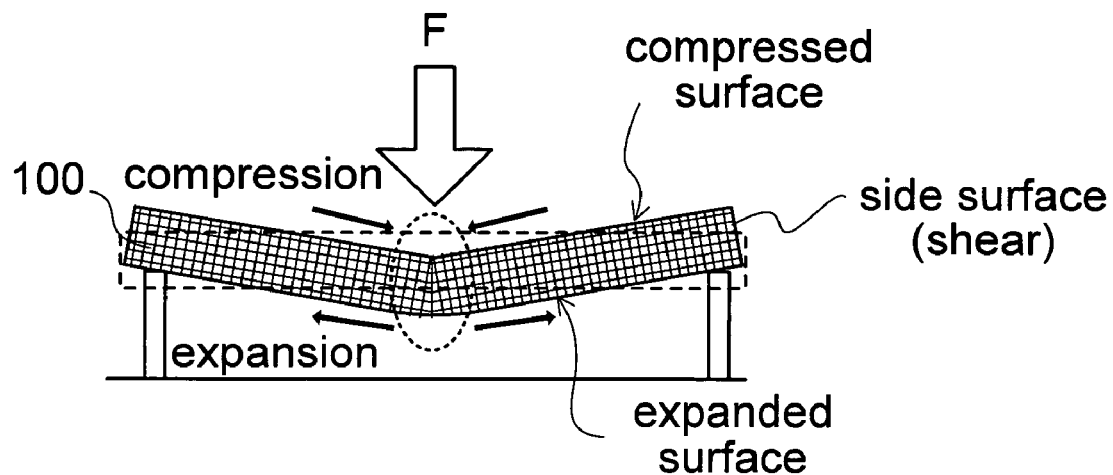
FIG. 5A is a pattern diagram showing a range of load and deformation when load is applied to the shock absorbing component.

A schematic diagram of when load is applied to the shock absorbing component of an automobile which receives bending deformation is shown in FIGS. 5A and B. In general, the pillar material receives three-point bending, with the upper part side roof rail and the lower part side sill as the fulcrum points. In the shock absorbing component in FIG. 5A, load and deformation is concentrated on only the center part of the shock absorbing component to which load is directly applied, during load due to impact, as shown by the dotted-line circle in the center. This is because the load is concentrated on the part wherein load is applied because the shock absorbing component is formed from equal surface components to the longitudinal direction.

Figure 5B:
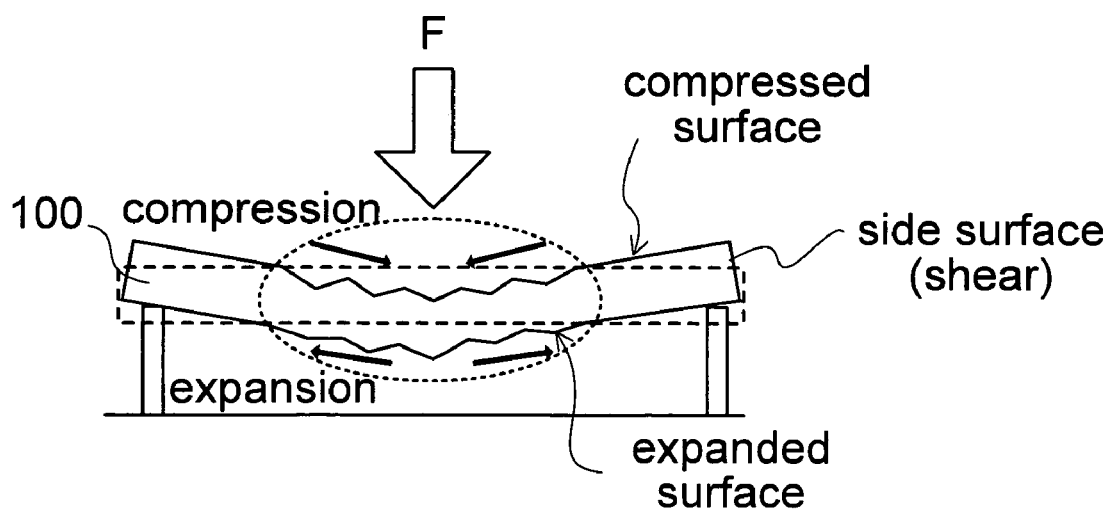
FIG. 5B is a pattern diagram showing a range of load and deformation when load is applied to the shock absorbing component.

Then, as shown in FIG. 5B, for a certain load, by receiving this load in a wide area of the shock absorbing component, the concentration of load and deformation can be prevented and it is thought that absorption energy efficiency can be enhanced. In order to receive load in a wide area of the shock absorbing component in this way, dispersion of load and dispersion of deformation is necessary. By placing components with differing tensile maximum load characteristics, tensile maximum displacement characteristics, compression maximum load characteristics, and compression maximum displacement characteristics to the longitudinal direction of the shock absorbing component accordingly, load and deformation can be intricately dispersed, individual load volume and deformation amount becomes small, and it is thought that load can be received in a wide area of the shock absorbing component.

The tensile maximum load characteristics is a property of the component characterized by the size of the deformation (degree of tensile strain) and the size of the load (maximum load) of the yielding point leading to the breaking of this component, when tensile load is applied to the component.

The compression maximum load characteristics is a property of the component characterized by the size of the deformation (degree of compressive strain) and the size of the load (maximum load) of the yielding point leading to the breaking of this component, when compressive load is applied to the component.

The tensile maximum displacement characteristics is a property of the component characterized by the size of the deformation (degree of tensile strain) and the size of the load (maximum load) of the yielding point leading to the breaking of this component, when tensile load is applied to the component. Unlike tensile maximum load characteristics, the property of the component is determined according to the amount of displacement for a certain load.

The compression maximum displacement characteristics is a property of the component characterized by the size of the deformation (degree of compressive strain) and the size of the load (maximum load) of the yielding point leading to the breaking of this component, when compressive load is applied to the component. Unlike compression maximum load characteristics, the property of the component is determined according to the amount of displacement for a certain load.

Figure 6A:
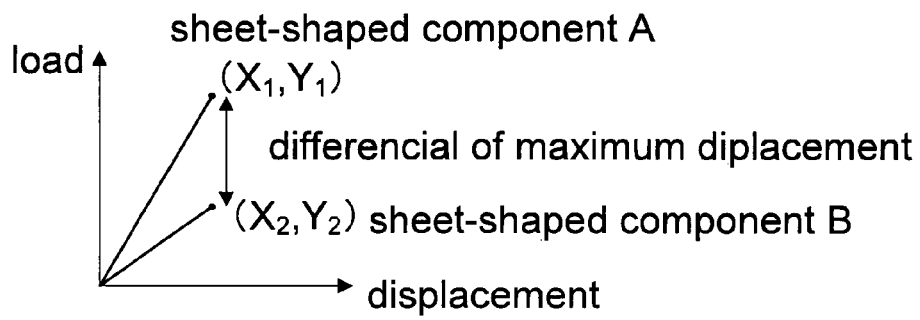
FIG. 6A is a diagram showing a formation of shock absorbing component by surface components having different load displacement characteristics.

A graph modeling the load displacement curve of surface components A, B, C and D is shown in FIGS. 6A and B. Because this graph merely shows on example, the load of the load displacement curve can be tensile load or compressive load. Here, $(X_1, Y_1)$ and $(X_2, Y_2)$ of FIG. 6A are points indicating the maximum load and the maximum displacement (yielding point) of sheet-shaped component A, and the component will undergo compression buckling if load exceeding this is applied. $(X_3, Y_3)$ and $(X_4, Y_4)$ FIG. 6B similarly indicate yielding points. According to FIG. 6A, sheet-shaped component A has a larger maximum load when comparing sheet-shaped component A and sheet-shaped component B with fixed displacement.

Figure 6B:
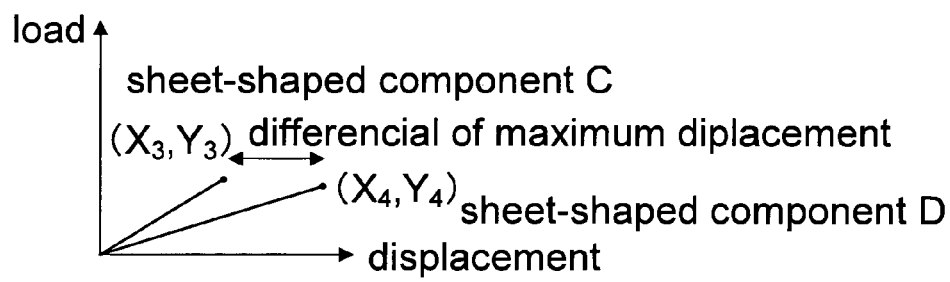
FIG. 6B is a diagram showing a formation of shock absorbing component by surface components having different load displacement characteristics.

On the other hand, when maximum displacement with fixed load is compared, sheet-shaped component D has a larger maximum displacement than sheet-shaped component C, as in FIG. 6B. From such characteristics of the sheet-shaped component, sheet-shaped component A is more suitable than sheet-shaped component B as a component which can tolerate load, and sheet-shaped component D is more suitable than sheet-shaped component C as a sheet-shaped component with a large displacement (strain) for load.

Figure 6C:
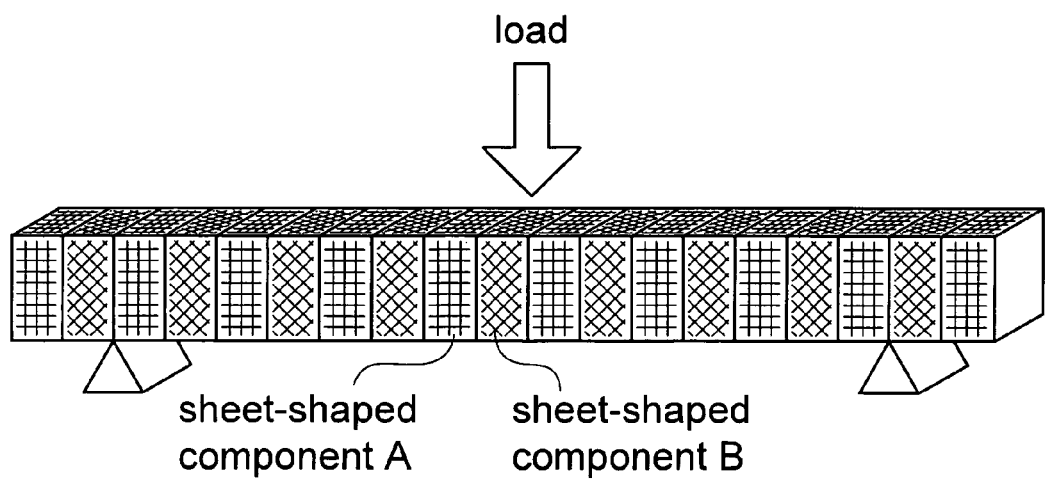
FIG. 6C is a diagram showing a formation of shock absorbing component by surface components having different load displacement characteristics.

If sheet-shaped components which have differing characteristics for tensile maximum load characteristics, tensile maximum displacement characteristics, compression maximum load characteristics, and compression maximum displacement characteristics are fragmented in this way as sheet-shaped part materials and implemented for surface components of the shock absorbing component as sheet-shaped longitudinal components formed by alternately placing the sheet-shaped part materials, load is intricately dispersed, the direction of strain becomes more intricate and therefore, it is thought that concentration of deformation can be prevented. More specifically, a sheet-shaped longitudinal component is formed by alternately placing two or more types of sheet-shaped part components of differing characteristics, described above, to the longitudinal direction, and this sheet-shaped longitudinal component is used for surface components of the shock absorbing component (FIG. 6C).

Figure 8:
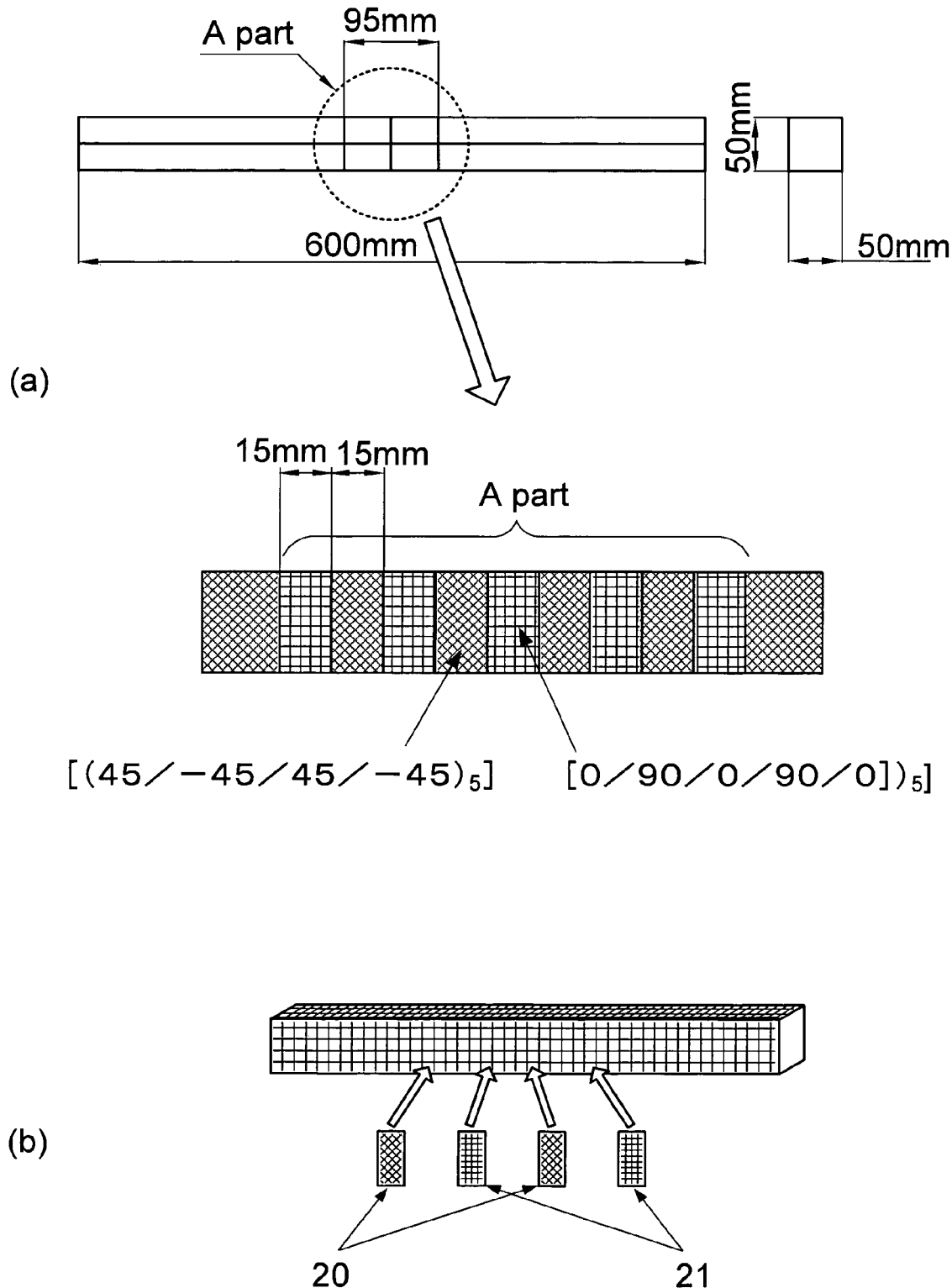
FIG. 8 is a diagram showing a size, position, and range of shock absorbing component according to the embodiment of the invention.

The stress strain curve for tension of UD material [0/90/0/90/0]s and UD material [45/−45/45/−45]s (dimensions: width 25 mm, length 200 mm, thickness 1 mm) is shown in FIG. 8A. Here, UD material [0/90/0/90/0]s indicates a sheet-shaped part material wherein five sets of two-layered sheet-shaped UD material (0 degrees) and two-layered sheet-shaped UD material (90 degrees) are layered. In other words, it is a sheet-shaped part material wherein a total of 10 layers of sheet-shaped UD material are layered in the following order: (0 degrees, 90 degrees, 0 degrees, 90 degrees, 0 degrees, 0 degrees, 90 degrees, 0 degrees, 90 degrees, 0 degrees). Similarly, UD material [45/−45/45/−45]s is a sheet-shaped part material wherein five sets of sheet-shaped UD material (45 degrees) and sheet-shaped UD material (−45 degrees) are alternately layers two layers at a time, respectively.

Figure 7:
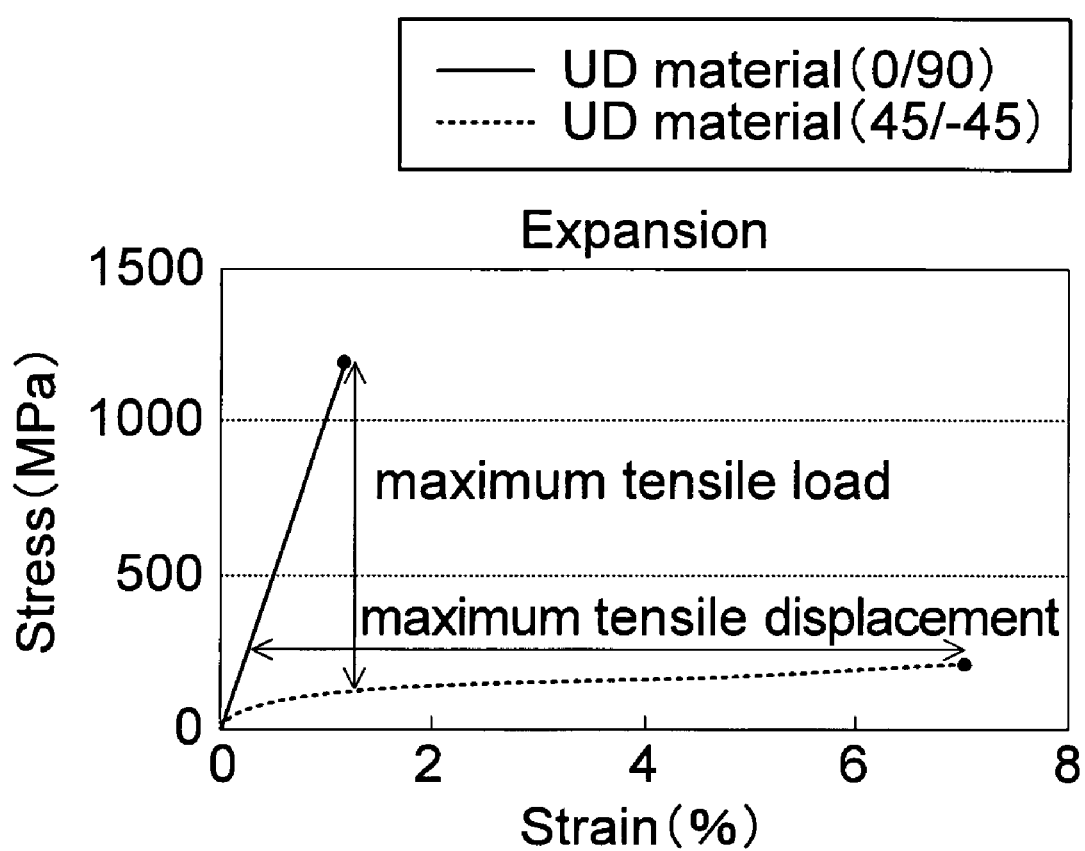
FIG. 7 is a graph showing a stress strain characteristics of UD material [0/90/0/90/0]s and UD material [45/−45/45/−45]s.

According to the stress strain curve (tensile stress) shown in FIG. 7, although UD material [0/90/0/90/0]s is strong against stress (holds large stress with little deformation) it is considered to have characteristics of being strong and fragile because it breaks at a certain strain. In contrast, although UD material [45/−45/45/−45]s is weak against stress (large deformation under little stress), it is considered to have characteristics of being weak and stretchable because the component per se breaks after straining long. Because each sheet-shaped component is destroyed at the end part of each curve, as is clarifies with the diagram, the sheet-shaped UD material has a difference of about 10 times with regards to tensile maximum load and a difference of about 50 times with regards to tensile maximum displacement.

A shock absorbing component wherein CFRP is implemented as the sheet-shaped component of the shock absorbing component UD material [0/90/0/90/0]s and UD material [45/−45/45/−45]s is placed only in A part to which load is concentrated is shown in FIG. 8(a). Here, the cross-section of the shock absorbing component used is 50×50 mm and 600 mm in the longitudinal direction. Furthermore, as reinforced fiber, Toho-Tenex K.K manufactured carbon fiber HTA is implemented and CRF formed from epoxide resin (#112) as the substrate is used.

When forming the sheet-shaped longitudinal component of the shock absorbing component, as shown in FIG. 8(b), the sheet-shaped longitudinal component can be a surface material of a hollow, long material, formed by alternately placing two different types of sheet-shaped part materials (sheet-shaped part material 20 and sheet-shaped part material 21).

Figure 9:
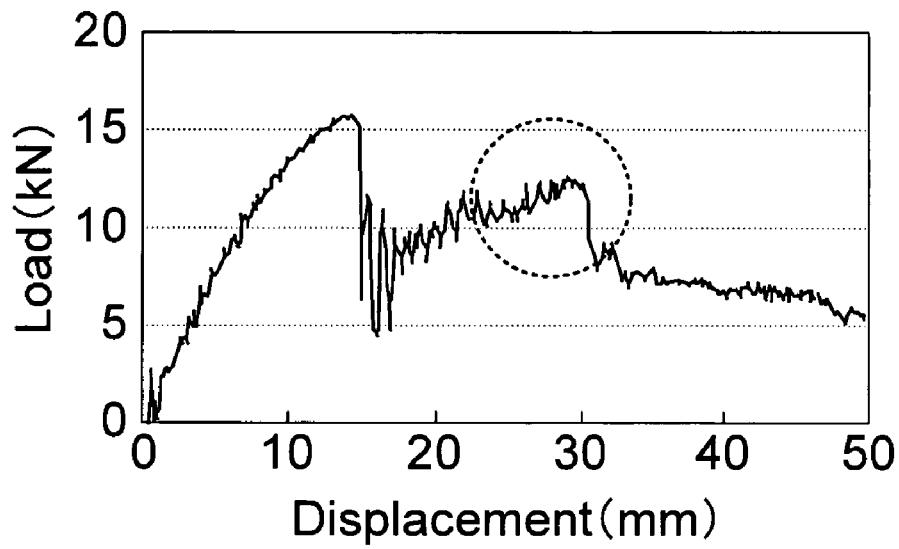
FIG. 9 is a graph showing a load displacement characteristics of shock absorbing component according to the embodiment of the invention.

In FIG. 9, the results of the load displacement characteristics of when three-point bending is performed on the shock absorbing component are shown. This shock absorbing component reached maximum load at a displacement of about 15 mm and a load of 16 kN, but thereafter, can maintain load at about 11 kN, and once again maintain a maximum load of about 12.5 kN at a displacement of slightly less than 30 mm. This is because, after receiving a large load in UD material [0/90/0/90/0]s, a second maximum load can be held due to the UD material [45/−45/45/−45]s dispersing load and bending moment to the surrounding area and preventing concentration of deformation. In addition, after the maximum load of UD material [0/90/0/90/0]s is exceeded, maximum load is considered to be reached when the load further applied is replaced with force which strains all UD material [45/−45/45/−45]s placed in the load part.

Figure 10:
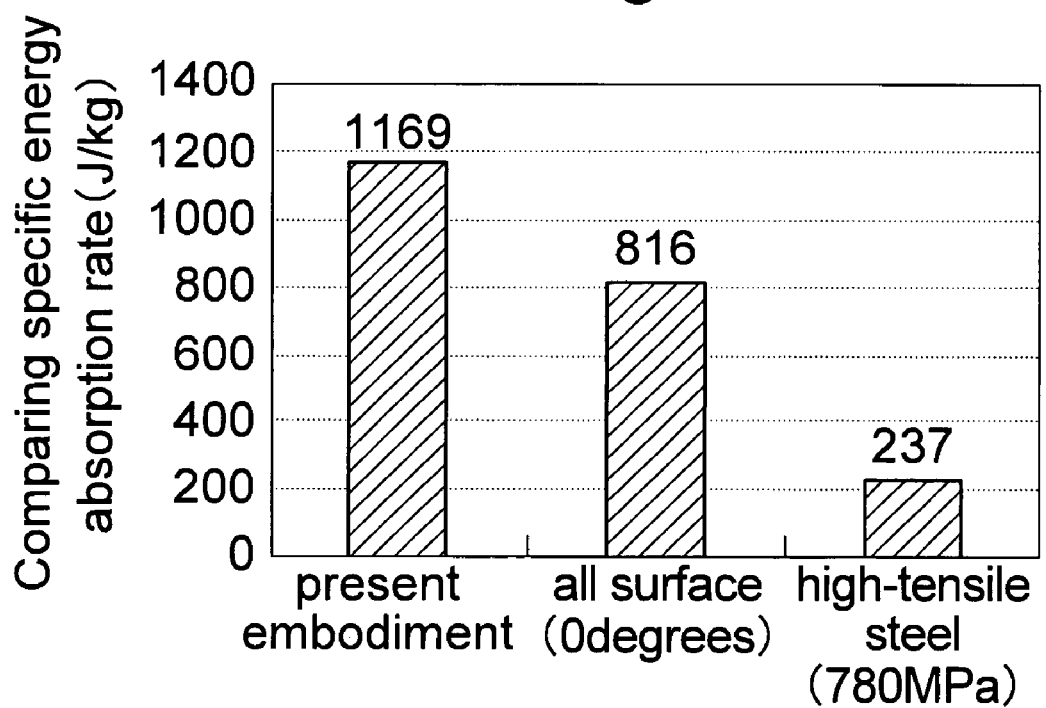
FIG. 10 is a graph showing energy absorption rate of shock absorbing component according to the embodiment of the invention.

A graph comparing the specific energy absorption rate when bending deformation is 50 mm is shown in FIG. 10. For comparison with the present embodiment, shown is a shock absorbing component wherein the entire surface uses the same form of beam material (carbon steel, 780 MPa high-tensile steel) and UD material (0 degrees). In the present embodiment, because a second rising of a load is generated as described above, it is clear that the absorption energy rate of load which is integrated at displacement is large compared to other shock absorbing components.

Although, in the present embodiment, the surface component is formed by layering sheet-shaped longitudinal part material formed by alternately placing UD material [0/90/0/90/0]s and UD material [45/−45/45/−45]s, for example, the shock absorbing component can be formed by alternately placing UD material [0/90/0/90/0]s and UD material [45/−45/45/−45]s over the entire surface, for a hollow, long, rectangular material implementing the surface component of UD material [0/90/0/90/0]s over the entire surface. In other words, all layers of the surface component of the shock absorbing component does not have to comprise sheet-shaped longitudinal components, and the sheet-shaped longitudinal component need only be implemented in one or more layer, out of the layers wherein the sheet-shaped longitudinal component is layered.

Furthermore, in the present invention, UD material [0/90/0/90/0]s and UD material [45/−45/45/−45]s which have differing tensile stress strain characteristics are used. However, the implementation of these two types of surface components is optional, and for example, two or more types if surface components can be combined from surface components with differing characteristics such as tensile maximum load characteristics, tensile maximum displacement characteristics, compression maximum load characteristics, and compression maximum displacement characteristics.

In addition, as in FIGS. 11A~D, the shock absorbing component is not limited to a rectangular body, and, for example, can be a triangular body (FIG. 11A), a quadrangular body (FIGS. 11B and D) or a twelve-sided body (FIG. 11C), and can also be a combination of complicated three-dimensional forms. The sheet component implemented for each surface is not limited to fiber reinforced plastic, but can be fiber reinforced metal, iron, aluminum, resin and the like. The structures of the fiber reinforced materials and fiber orientation angles are merely examples and various combinations other than these can be also be implemented.

Here, sheet-shaped longitudinal material is shown using three types of sheet part materials in FIG. 11B. In this way, two or more sheet-shaped part materials can be implemented, as well.

Figure 11D:
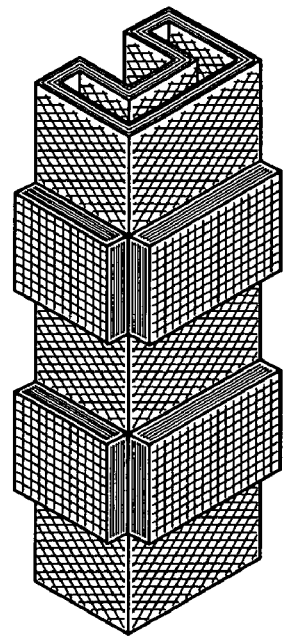
FIG. 11D is a diagram showing embodiment of shock absorbing component other than the embodiment of the present invention.

In FIG. 11D, cases wherein the thickness of the surface component of the shock absorbing material differs with the type of sheet-shaped part material are shown. By changing the number of sheets layered according to the type of sheet-shaped part material, the thickness of the surface component can be adjusted. In this way, by changing the number of layers layered, it can be considered that the load and strain will become even more intricate at the time of impact load. In other words, although the shock absorbing component can be characterized by the tensile maximum load characteristics, tensile maximum displacement characteristics, compression maximum load characteristics, and compression maximum displacement characteristics, in addition to these, adjustments can be made by the degree these characteristics are layered.

As one example of the shock absorbing component, regardless of what three-dimensional form the shock absorbing component has, when used as a structural component of an automobile, if it is used as, for example, pillar material, the direction from the roof of the automobile to the chassis can be the longitudinal direction of the shock absorbing component.

The present invention is a structural component for absorbing impact, and is a shock absorbing component which actualizes a higher specific energy absorption volume and lighter weight than the conventional shock absorbing component. By using this component in, for example, the pillar of an automobile or the like, an automobile which ensures a lighter weight and enhanced safety than the conventional can be provided.

What is claimed is:

1. A shock absorbing component comprising:
a hollow columnar shaped body,
wherein a side surface of the body includes a sheet-shaped longitudinal component formed by a plurality of sheet-shaped part materials provided thereon,
wherein the plurality of sheet-shaped part materials include a first part material and a second part material,
wherein the first and second part materials are alternately arranged on the side surface of the body and at least one of which is provided with at least one of a tensile maximum load characteristic, a tensile maximum displacement characteristic, a compression maximum load characteristic, and a compression maximum displacement characteristic,
wherein the first part material is formed with at least first and second layers, and fibers of the first layer are provided approximately 0 degrees in a direction that is parallel to a longitudinal axis of the body and fibers of the second layer are provided approximately 90 degrees in the longitudinal axis direction, and
wherein the second part material is formed with at least third and fourth layers, and fibers of the third layer are provided approximately 45 degrees in the longitudinal axis direction and fibers of the fourth layer are provided approximately −45 degrees in the longitudinal axis direction.

2. The shock absorbing component according to claim 1, wherein at least one of the first and second part materials is formed from a fiber reinforced material.

3. The shock absorbing component according to claim 2, wherein the fiber reinforced material includes fibers aligned in substantially a same direction.

4. The shock absorbing component according to claim 3, wherein the fiber reinforced material includes carbon fibers and a substrate.

5. The shock absorbing component according to claim 1, wherein the first part material has a thickness that is different from a thickness of the second part material.

6. The shock absorbing component according to claim 1, wherein the shock absorbing component is used as a structural component of a vehicle.

7. The shock absorbing component according to claim 1, wherein at least one of the first and second part materials comprise a different number of layers.

8. A shock absorbing component which is configured with columnar structure comprising:
a hollow columnar shaped body,
wherein a side surface of the body includes a sheet-shaped longitudinal component formed by a plurality of sheet-shaped part materials provided thereon,
wherein the plurality of sheet-shaped part materials includes a first part material and a second part material,
wherein the first and second part materials are alternately arranged on the side surface and at least one of which is provided with at least one of a tensile maximum load characteristic, a tensile maximum displacement characteristic, a compression maximum load characteristic, and a compression maximum displacement characteristic,
wherein at least one of the first and second sheet-shaped part materials is formed from a fiber reinforced material comprising a plurality of fibers,
wherein the fiber reinforcement material is a sheet-shaped UD material and the plurality of fibers are aligned in a substantially same direction, and
wherein the sheet-shaped UD material has a first sheet-shaped UD material provided approximately 0 degrees in a direction that is parallel to a longitudinal axis of the body, a second sheet-shaped UP material is layered on top of the first sheet-shaped UD material and in a direction that is orthogonal relative to the direction of the first sheet-shaped UD material, a third sheet-shaped UD material layered on top of the second sheet-shaped UD material in a direction that is approximately 45 degrees relative to the longitudinal axis of the body, and a fourth sheet-shaped UD material layered on top of the third sheet-shaped material in a direction that is approximately −45 degrees relative to the longitudinal axis of the body.

9. The shock absorbing component according to claim 8, wherein a thickness of a surface component is different from a thickness of at least one of the first through fourth sheet-shaped part materials.

10. The shock absorbing component according to claim 8, wherein the component is used as a structural component of a vehicle.

11. A shock absorbing component having a longitudinal direction and a lateral direction and which absorbs an impact force via a bending deformation that occurs approximately orthogonally relative to the longitudinal direction, the component comprising:
a hollow body including at least one flat surface and one curved surface, each of the at least one flat and curved surfaces including a plurality of surface components formed by layered sheet-shaped components;
a sheet-shaped longitudinal component formed by positioning at least two different kinds of sheet-shaped part materials, wherein the at least two different kinds of sheet-shaped part materials are characterized by one or more characterizations selected from a group including a tensile maximum load characteristic, a tensile maximum displacement characteristic, a compression maximum load characteristic, and a compression maximum displacement characteristic, alternately in the longitudinal direction, and wherein the sheet-shaped longitudinal component is implemented in at least a portion of layers of the surface components,
wherein the sheet-shaped part materials are sheet-shaped UD materials having a fiber direction aligned in approximately a single direction,
wherein the sheet-shaped UD material includes a first sheet-shaped UD material provided approximately 0 degrees in a direction that is parallel to a longitudinal axis of the body, a second sheet-shaped UP material is layered on top of the first sheet-shaped UD material and in a direction that is orthogonal relative to the direction of the first sheet-shaped UD material, a third sheet-shaped UD material layered on top of the second sheet-shaped UD material in a direction that is approximately 45 degrees relative to the longitudinal axis of the body, and a fourth sheet-shaped UD material layered on top of the third sheet-shaped material in a direction that is approximately −45 degrees relative to the longitudinal axis of the body.

12. The shock absorbing component according to claim 11, wherein a thickness of a surface component is different from a thickness of at least one of the first through fourth sheet-shaped part materials.

13. The shock absorbing component according to claim 11, wherein the component is used as a structural component of a vehicle.

* * * * *